United States Patent Office 3,180,772
Patented Apr. 27, 1965

3,180,772
AMMONIUM NITRATE PROPELLANT
Donald J. O'Connor, Seymour, Ind., and Wayne A. Proell, Chicago, Ill., assignors to Standard Oil Company, Chicago, Ill., a corporation of Indiana
No Drawing. Filed Dec. 4, 1961, Ser. No. 157,612
5 Claims. (Cl. 149—47)

This invention relates to ammonium nitrate-base compositions particularly suitable for use as propellants.

We have discovered an ammonium nitrate-base composition suitable for gas generator and rocketry usage characterized by having an extra low flame temperature, yet at the same time being thermally stable and clean burning. Our new composition has the additional advantages of yielding an exhaust gas which has an unusually low water content and an unusually high hydrogen content relative to ammonium nitrate-type compositions heretofore known.

The composition herein claimed comprises ammonium nitrate as the largest single component, between about 1 to 20% of a compound of either guanidine nitrate or nitroguanidine, between about 10 to 40 weight percent of an oxidizable binder material, between about ¼ to 10% of either ammonium oxalate or urea oxalate, a combustion catalyst and, optionally, a gas evolution stabilization additive and other additives referred to hereinafter.

The ammonium nitrate used in our composition may be ordinary commercial ammonium nitrate, such as is used for fertilizers, or military grade ammonium nitrate. The commercial grade nitrate contains a small amount of impurities, and the particles of nitrate are usually coated with a moisture-resisting material, such as paraffin wax. Military grade ammonium nitrate is almost chemically pure, and is particularly suitable for use in our composition. The ammonium nitrate is preferably used in a finely divided particulate form which may be obtained either by prilling or by grinding. Ammonium nitrate is the largest single component of our composition, and comprises between about 40 to about 70%, advantageously from about 45 to 55%, of the composition. (All composition percentages set forth herein are percent by weight based on the total components of the composition.)

The composition also contains from about 1 to about 20% of guanidine nitrate ($NH_2$—$C(NH)$—$NH_2 \cdot HNO_3$) or nitroguanidine ($NH_2$—$C(NH)$—$NH$—$NO_2$), or mixtures thereof, which are used as cool oxidants to aid in reducing the flame temperature of the burning composition. A preferred amount of guanidine nitrate and/or nitroguanidine is from about 5 to 15%. Chemically pure nitroguanidine or guanidine nitrate may be used, but such purity is not necessary, inasmuch as we have found the commercially available technical grade products (95% purity) are acceptable. The guanidine nitrate and/or nitroguanidine is, like the ammonium nitrate, preferably used in a finely divided particulate form.

In order to permit the shaping of the ammonium nitrate composition into definite configurations, a matrix former or oxidizable organic binder material is used. When ammonium nitrate decomposes, free-oxygen is formed. The existence of this free-oxygen is used by incorporating oxidizable organic materials as the binder. These oxidizable organic binder materials may contain only carbon and hydrogen, for example, high molecular weight hydrocarbons such as asphalts or residuums, and rubbers, either natural or synthetic. Or, the binder material may contain other elements in addition to carbon and hydrogen, for example, as in Thiokol rubber and neoprene. The stoichiometry of the composition is improved, with respect to smoke production, by the use of oxygenated organic materials as the binders. The binder or matrix former may be a single compound such as a rubber or asphalt or, advantageously, it may be a mixture of compounds. The mixtures are particularly suitable when special characteristics are to be imparted to the grain which cannot be obtained by the use of a single compound.

The multi-component binder or matrix former commonly consists of a polymeric base material and a plasticizer therefor, and comprises between about 10% to 40% of the finished composition. Particularly suitable polymeric base materials are cellulose esters of alkanoic acids containing from 2 to 4 carbon atoms such as cellulose acetate, cellulose acetate butyrate and cellulose propionate; the polyvinyl resins such as polyvinylchloride and polyvinyl acetate are also good bases; styrene acrylonitrile is an example of a copolymer which forms a good base material. In general, a multi-component binder contains between about 5% to 25% of the particular polymeric base material, advantageously 10% to 20%.

The plasticizer component of the binder is broadly defined as an oxygenated hydrocarbon. The hydrocarbon base may be aliphatic or aromatic or may contain both forms. The oxygen may be present in the plasticizer in either linkage and/or hydroxyl group and/or carboxyl groups; also the oxygen may be present in inorganic substituents, particularly nitro groups. In general, any plasticizer which is adopted to plasticize the particular polymer may be used in the invention. Exemplary classes of plasticizers which are suitable are set out below. It is to be understood that these classes are illustrative only and do not limit the types of oxygenated hydrocarbons which may be used to plasticize the polymer.

Di-lower alkyl-phthalates, e.g., dimethyl phthalate, dibutyl phthalate, dioctyl phthalate and dimethyl nitrophthalate.

Nitrobenzenes, e.g., nitrobenzene, dinitrobenzenes, nitrotoluene, di-nitrotoluene, nitroxylene, and nitrodiphenyl.

Nitrodiphenyl ethers, e.g., nitrodiphenyl ether and 2,4-dinitrodiphenyl ether.

Tri-lower alkyl-citrates, e.g., triethyl citrate, tributyl citrate and triamyl citrate.

Acyl tri-lower alkyl-citrates where the acyl group contains 2–4 carbon atoms, e.g., acetyl triethyl citrate and acetyl tributyl citrate.

Glycerol-lower alkanoates, e.g., monoacetin, triacetin, glycerol tripropionate and glycerol tributyrate.

Lower alkylene-glycol-lower alkanoates wherein the glycol portion has a molecular weight below about 200, e.g., ethylene glycol diacetate, triethylene glycol dihexoate, triethylene glycol dioctoate, polyethylene glycol dioctoate, dipropylene glycol diacetate, nitromethyl propanediol diacetate, hydroxyethyl acetate and hydroxy propyl acetate (propylene glycol monoacetate).

Dinitrophenyl-lower alkyl-lower alkanoates, e.g., dinitrophenyl ethylacetate, and dinitrophenyl amyloctoate.

Lower alkylene-glycols wherein the molecular weight is below about 200, e.g., diethylene glycol, polyethylene glycol (200), and tetrapropylene glycol.

Lower alkylene-glycol oxolates, e.g., diethylene glycol oxolate and polyethylene glycol (200) oxolate.

Lower alkylene-glycol maleates, e.g., ethylene glycol maleate and bis-(diethylene glycol monoethyl ether) maleate.

Lower alkylene-glycol diglycolates, e.g., ethylene glycol diglycolate and diethylene glycol diglycolate.

Miscellaneous diglycollates, e.g., dibutyl diglycollate, dimethylalkyl-diglycollate and methyl-Carbitol diglycollate.

Lower alkyl-phthalyl-lower alkyl-glycollate, e.g., methyl phthalyl ethyl glycollate, ethyl phthalyl ethyl glycollate and butyl phthalyl butyl glycollate.

Di-lower alkyloxy-tetraglycol, e.g., dimethoxy tetra glycol and dibutoxy tetra glycol.

Nitrophenylether of lower alkylene glycols, e.g., dinitrophenyl ether of triethylene glycol and nitrophenyl ether of polypropylene glycol.

Nitrophenoxy alkanols wherein the alkanol portion is derived from a glycol having a molecular weight of not more than about 200. These may be pure compounds or admixed with major component bis(nitrophenoxy) alkane.

Although a single plasticizer may be used, two or more plasticizers may be used in conjunction with each other to yield a superior binder. The particular requirements with respect to use will determine not only the polymer but also the particular plasticizer or combination of plasticizers which are used.

In addition to the foregoing basic components, i.e., binder, ammonium nitrate, and guanidine nitrate and/or nitroguanidine, our composition contains a small amount, between about ¼% to about 10%, preferably between about 1% and 5%, of an ammonium oxalate or a urea oxalate. We prefer to use the di-ammonium or di-urea oxalate rather than the mono-substituted products, i.e., ammonium acid oxalate or monourea oxalate, inasmuch as the acidic properties of the mono-substituted oxalates tend to decrease thermal stability. The oxalate or mixtures of oxalates used in our composition are preferably in finely divided particulate form.

A combustion catalyst comprises a minor portion, from about ¼ to about 10%, of our composition. The catalyst is added to attain smooth burning at a uniform rate, like a cigarette, of the finished composition. Many combustion catalysts which promote the burning of ammonium nitrate-base compositions are known. We prefer an alkali metal barbiturate, particularly sodium barbiturate, using in the range of about ½ to 4%. Two other catalysts which are suitable for use in our composition, and which do not contain any metal atoms, are pyrogene blue (Color Index 956–961) and methylene blue. Other suitable but less preferable catalysts are those selected from primarily inorganic compounds, such as ammonium chromate or dichromate, alkali metal chromates, chromic nitrate, copper chromite, ethylene diamine chromate, cyanides of heavy metals, such as cobalt, copper and nickel, and various Prussian blues.

Our new composition may optionally, and frequently advantageously, contain other constituents. Various burning rate promoters, such as finely divided carbon, which are not catalysts per se may be incorporated. Oximes or asphalt may be used to improve low temperature ignitability. Aromatic amines are advantageously used as gas evolution stabilization additives. Examples of such aromatic amines are toluene diamine, diphenyl amine, naphthalene diamine, and toluene triamine. In general, the aromatic hydrocarbon amines are used in amounts between about 0.5 and 5%. While these aromatic hydrocarbon amines are effective, they are frequently not sufficiently effective for severe duties when used alone. It has been found that superior stabilization obtained when N-phenylmorpholine is used with an aromatic hydrocarbon amine. Because of the plasticizing power of the N-phenylmorpholine, it is generally desirable to use the aromatic hydrocarbon amines as the primary stabilizing additive and the N-phenylmorpholine in an amount needed to obtain the specific stability. In general, when aromatic hydrocarbon amines are present between about 0.1% and 1% of N-phenylmorpholine will be used.

SAMPLE COMPOSITIONS

A number of compositions were prepared and tested for burning rate, storage stability and other characteristics required by military specifications, as hereinafter described.

Composition A was prepared by mixing together under vacuum for about 2⅓ hours a 16½ kilogram batch having components in the proportions set forth hereinafter. The mixing was done under vacuum using a jacket temperature in the range of about 100–115° C. during most of the mixing period. The cellulose acetate used as the polymeric base was of commercial grade analyzing about 55% acetic acid equivalent. Acetyl triethyl citrate and dinitrophenoxy ethanol were used as plasticizers. Toluene diamine and N-phenylmorpholine were used as gas evolution stabilizers. The catalyst was sodium barbiturate. About 13.4% of guanidine nitrate and 1% of di-ammonium oxalate were used. The relative proportions of Composition A, and of hereinafter described Composition B, are set forth following the description of Composition B.

The ballistic properties of Composition A, as determined in strand bombs and motor firings, were: pressure coefficient, 0.50; burning rate at 70° F. and 1000 p.s.i., 0.072; calculated flame temperature (calculated according to the procedure referred to in chapter IV of "Rocket Propulsion Elements," by Mr. G. P. Sutton), 1350° F.

Composition B was prepared in the amount of 16½ kilograms in a manner similar to Composition A, except that total mixing time was only 2 hours 5 minutes, and jacket temperature was held during most of such period in the range of about 110–117° C. About 3% ammonium oxalate was used.

The ballistic properties of Composition B, as determined in strand bombs and motor firings, were: pressure coefficient, 0.51; burning rate at 70° F. and 1000 p.s.i., 0.054; and calculated flame temperature, 1213° F.

Table I

| Composition | A | B |
|---|---|---|
| Components, percent: | | |
| Ammonium Nitrate | 45.57 | 45.85 |
| Guanidine Nitrate | 13.44 | 13.52 |
| Acetyl triethyl citrate | 13.18 | 12.54 |
| Cellulose acetate | 10.00 | 10.08 |
| Dinitrophenoxy ethanol | 10.00 | 10.08 |
| Carbon black | 2.95 | 2.97 |
| Sodium Barbiturate | 2.95 | 0.99 |
| Di-ammonium Oxalate | 0.98 | 2.97 |
| Toluene diamine | 0.49 | 0.50 |
| N-phenylmorpholine | 0.45 | 0.50 |

Four compositions were prepared to illustrate the interaction of guanidine nitrate and ammonium oxalate on the thermal stability of ammonium nitrate-based compositions. Composition C comprised approximately 10.2% cellulose acetate, 11.6% acetyl triethyl citrate, 10.2% dinitrophenoxy ethanol, 3% carbon black, 3% sodium barbiturate, and 0.5% each of toluene diamine and N-phenylmorpholine, and 61% ammonium nitrate. In Compositions D, E and F, guanidine nitrate was substituted for ammonium nitrate in the amount of 14%; that is the ammonium nitrate was reduced from 61 to 47%. In addition, ammonium oxalate was added to Compositions E and F in the amounts indicated in the following table, and the amount of sodium barbiturate was reduced to 1%, with the relative proportions of all other constituents being decreased as the amount of ammonium oxalate was increased, and being increased as the amount of sodium barbiturate was decreased.

Compositions C through F were tested for thermal stability by heating at 150° C. The test results are reported below as hours at 150° C. before gas evolution began, the longer induction periods indicating greater thermal stability:

Table II

| Composition | C | D | E | F |
|---|---|---|---|---|
| Guanidine nitrate, percent | 0 | 14 | 14 | 14 |
| Ammonium Oxalate, percent | 0 | 0 | 1.3 | 2 |
| Induction Period at 150° C., (hours) | 6 | 2 | 3 | 6 |

Five additional compositions (Compositions H, I, J, K and L) were prepared to illustrate the effect of varying amounts of guanidine nitrate on the burn rate-pressure slope and burn rate. These compositions comprised approximately 10.2% cellulose acetate, 11.6% triethyl citrate, 10.2% dinitrophenoxy ethanol, 3.0% carbon black, 3.0% sodium barbiturate, 0.5% each of toluene diamine and N-phenylmorpholine. The remaining 61.0% of the composition consisted of ammonium nitrate and guanidine nitrate, with the amount of guanidine nitrate varying from 1 to 25% (and the ammonium nitrate varying accordingly from 60 to 36%). Although no ammonium oxalate was used, the effect of the guanidine nitrate on the ballistic variables in question is illustrated. The pressure slope and burn rate data for these compositions are tabulated below:

*Table III*

| Composition | H | I | J | K | L |
|---|---|---|---|---|---|
| Guanidine Nitrate, percent | 1 | 3 | 5 | 14 | 25 |
| Pressure Slope | 0.61 | 0.51 | 0.41 | 0.44 | 0.47 |
| Burn Rate, 1,000 p.s.i. | 0.075 | 0.067 | 0.055 | 0.051 | 0.063 |

In addition to having the desired slow burning characteristic combined with thermal stability, our compositions also have the advantage over previously known ammonium nitrate-based compositions of being characterized by having an unusually low water content in the exhaust gas, and an unusually high hydrogen content in the exhaust gas. The low water content characteristic is advantageous in propellants used in pressurization applications, and the high hydrogen content characteristic is advantageous in propellants used as afterburners and in hybrid propulsion units. A typical composition of exhaust gas from a propellant having the composition similar to that of Composition B is 23% carbon monoxide, 13% carbon dioxide, 16% nitrogen, 38% hydrogen, and 10% water. In contrast, the exhaust gas composition from a propellant such as Composition C comprises 23% carbon monoxide, 10% carbon dioxide, 17% nitrogen, only 29% hydrogen, and 21% water.

We claim:

1. In a solid propellant composition comprising from about 40 to about 70 weight percent ammonium nitrate, the improvement of incorporating therein as combustion catalyst modifiers from about 1% to about 20% by weight based on said composition of a first member selected from the class consisting of guanidine nitrate, nitroguanidine and mixtures thereof, and from about ¼% to about 10% of a second member selected from the class consisting of an ammonium oxalate, a urea oxalate and mixtures thereof.

2. In a solid propellant composition comprising from about 40 to about 70 weight percent ammonium nitrate, the improvement of incorporating therein as combustion catalyst modifiers from about 1% to about 20% by weight based on said composition of a first member selected from the class consisting of guanidine nitrate, nitroguanidine and mixtures thereof, and from about ¼% to about 10% of a second member selected from the class consisting of an ammonium oxalate, a urea oxalate and mixtures thereof, said composition being characterized by a lower combustion flame temperature, and the combustion gases therefrom being characterized by a higher hydrogen concentration and a lower water concentration relative to said propellant compositions excluding said members.

3. The composition of claim 2 wherein said first member comprises in the range of about 5 to about 15% of said composition.

4. The composition of claim 2 wherein said first member is guanidine nitrate.

5. The composition of claim 2 wherein said second member comprises in the range of about ½ to about 4% of said composition.

References Cited by the Examiner

UNITED STATES PATENTS

| 2,159,234 | 5/39 | Taylor | 149—46 |
| 2,637,274 | 5/53 | Taylor et al. | 149—92 |
| 2,938,780 | 5/60 | Proell et al. | 149—19 |
| 3,031,347 | 4/62 | Philipson | 149—19 X |
| 3,041,216 | 6/62 | Bice | 149—92 X |

CARL D. QUARFORTH, *Primary Examiner.*

REUBEN EPSTEIN, LEON D. ROSDOL, *Examiners.*